Sept. 8, 1931.　　　　W. H. PIERCE　　　　1,822,845
FASTENING INSTALLATION
Filed Aug. 30, 1926
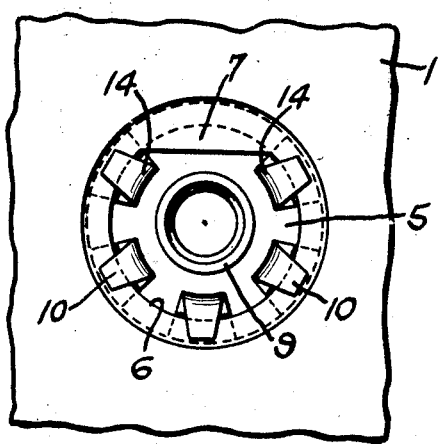
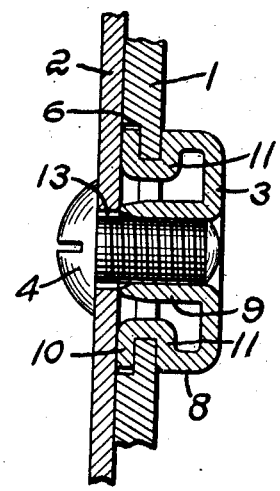
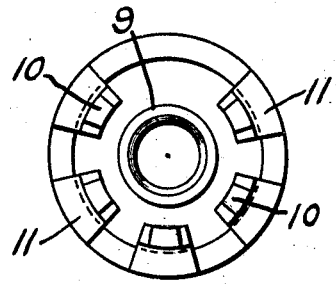
Inventor:
Walter H. Pierce,
by Emery, Booth, Janney & Varney,
Attys.

Patented Sept. 8, 1931

1,822,845

UNITED STATES PATENT OFFICE

WALTER H. PIERCE, OF WATERTOWN, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

FASTENING INSTALLATION

Application filed August 30, 1926. Serial No. 132,402.

This invention aims to provide improvements in fastening installations and more particularly to improvements in nuts for use in connection with such fastening installations.

In the drawings, which illustrate a preferred embodiment of my invention:—

Figure 1 is an elevation view of the frame part and nut assembled thereto;

Fig. 2 is a section through the complete installation showing a part secured to the frame by the nut and screw fastening; and Fig. 3 is an elevation view of the one-piece nut.

Referring to the embodiment of my invention illustrated in the drawings, I have shown a nut and screw fastening installation which includes a frame 1, a part 2 to be secured to the frame, a nut 3 and a screw 4.

The frame 1 is provided with a non-circular aperture 5 which in this instance is shown as an aperture surrounded by a wall 6, the greater portion of which is circular, but one portion being straight. A portion of the metal of the frame may be depressed around the aperture so as to provide a recess 7.

The nut 3 is preferably pressed from a single piece of metal and has a body portion 8, from which is pressed a threaded portion 9, screw-threaded to receive the screw 4. A series of attaching prongs 10 are provided at the outer peripheral edge of the body portion. These prongs are bent inwardly a short distance toward the center of the body 8 and then extend outwardly in the form of a semicircle (Fig. 3) to conform with the wall 6 of the aperture 5, as shown in Fig. 1.

In this instance, as shown in Figs. 1 and 2, the nut 3 is assembled with the frame 1 by entering the prongs 10 through the aperture from the rear face of the frame, so that the inwardly bent portions 11 of the prongs bear against the inner face of the frame. The prongs are then bent downwardly in the recess 7 against the outer face of the frame, thereby rigidly securing the nut to the frame. The recess 7 keeps the prongs below the inner face of the frame 1, thereby providing a smooth surface to which the part 2 may be applied by means of the screw 4, as shown in Fig. 2. The aperture 13 through which the screw passes may be the same diameter as the threaded portion of the screw or, as illustrated, it may be larger in diameter so as to permit ready alignment of the screw with the screw-threaded portion 9.

During engagement of the screw 4 with the nut 3, the nut is held against turning movement relative to the frame by the cooperation of the edges of the prongs 14, at each end of the semicircle, with the straight portion of the wall 6, as shown in Fig. 1.

This type of fastening device is particularly, though not exclusively, adapted for use in motor vehicle body construction. It may be used to fasten locks, hinges, plates, fenders and other parts of the body together and is particularly useful in connection with securing parts together which are so arranged that a tool cannot readily be used at the inner face of the frame 1 to hold a nut against turning while the screw is being tightened.

While I have shown and described a preferred embodiment of my invention, I do not wish to be limited thereby, my invention being best defined in the following claims.

Claims:

1. A one-piece pressed metal nut fastener comprising a hollow body portion, a screw-receiving portion and a series of attaching prongs relatively closely arranged in semi-circular relation to said body to provide a relatively larger space between two of said prongs than the other prongs thereby providing means for securing said nut fastener in non-rotatable relation to a nut-carrying support.

2. A nut device pressed from a single piece of sheet metal and comprising a substantially cup-shaped body portion, a tubular screw-receiving portion pressed from the bottom of said body portion and a plurality of attaching means extending from said body portion adjacent to the open end thereof and arranged in a non-circular peripheral outline for rigid engagement with a support to secure said nut in non-rotatable relation thereto.

3. A sheet metal nut having a hollow body portion comprising a bottom, an annular wall extending from the outer periphery of said bottom, a narrow flange extending inwardly from the free edge of said wall in spaced relation to the said bottom, a threaded tubular portion extending from said bottom in the same direction as said annular wall and past said narrow flange to provide a support for a part to be secured thereagainst and attaching means extending from the free edge of said flange for securing the fastening device to a support.

In testimony whereof, I have signed my name to this specification.

WALTER H. PIERCE.